Oct. 29, 1963   M. M. BOWMAN, JR., ETAL   3,108,374
REMOVAL OF INTERNAL FLASH FROM WELDED SECTIONS OF CONDUIT
Filed Nov. 10, 1960
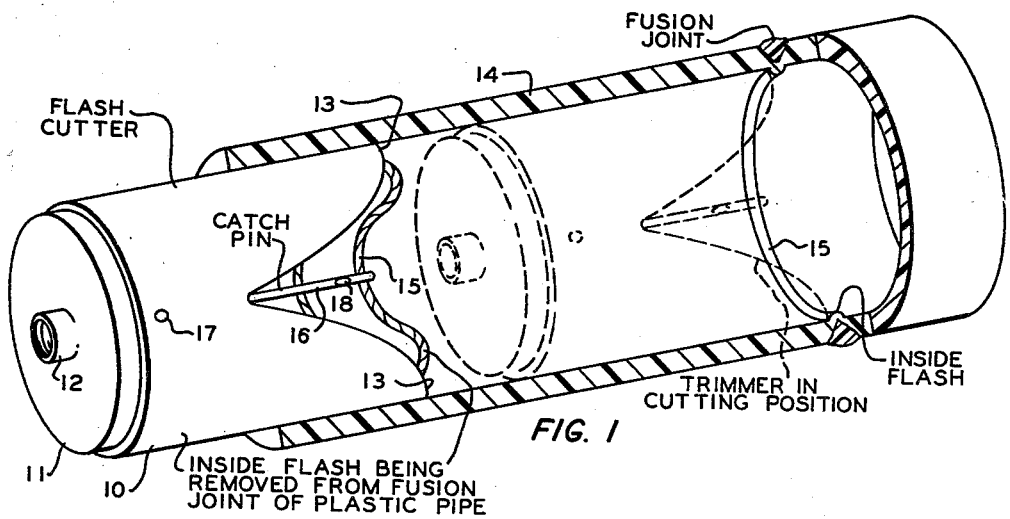
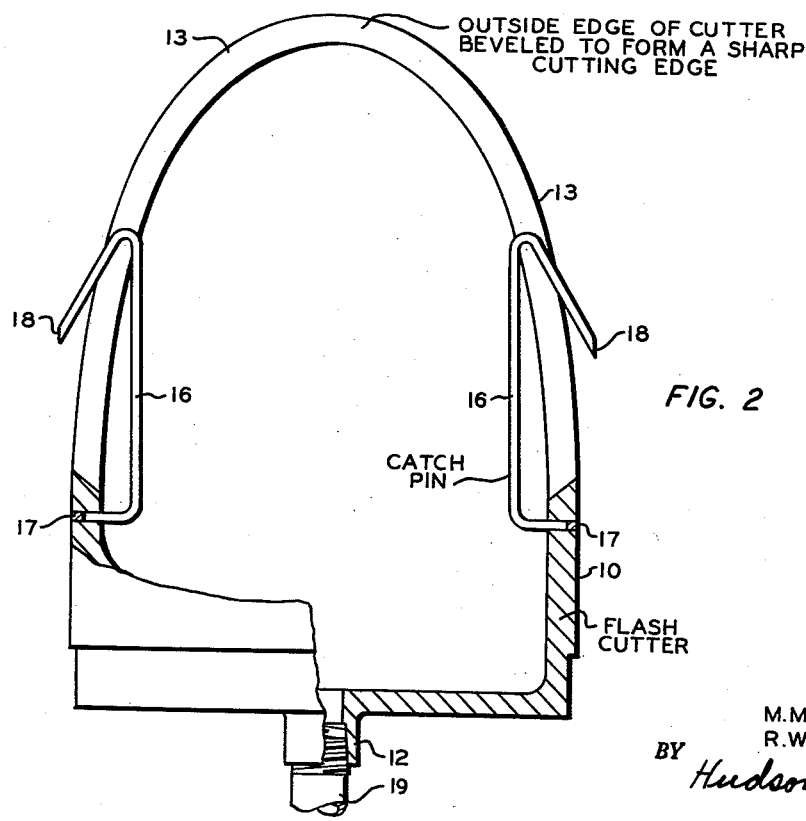
INVENTORS
M.M. BOWMAN, JR.
R.W. MATTHEWS
BY Hudson and Young
ATTORNEYS

United States Patent Office 3,108,374
Patented Oct. 29, 1963

3,108,374
REMOVAL OF INTERNAL FLASH FROM WELDED SECTIONS OF CONDUIT
Mark M. Bowman, Jr., Bartlesville, and Robert W. Matthews, Dewey, Okla., assignors to Phillips Petroleum Company, a corporation of Delaware
Filed Nov. 10, 1960, Ser. No. 68,515
4 Claims. (Cl. 30—130)

This invention relates to the welding together of sections of thermoplastic conduit. In one of its aspects it relates to means for removing the internal flash or bead which results from the butt-welding of sections of thermoplastic conduit. In another of its aspects the invention relates to means for shearing the internal flash from a welded conduit and for removing the severed flash from the conduit.

Tubes, pipes, and other conduits of thermoplastic materials such as polyethylene, polystyrene, poyvinylchloride, nylon and other thermoplastic materials are particularly useful for transporting corrosive fluids at relatively low pressures. Thermoplastic conduits fabricated from semi-rigid thermoplastic materials such as polyethylene are useful in many other applications such as for electrical conduits and in vacuum conveyer systems. The most satisfactory method for joining together sections of thermoplastic conduit has been by the butt-welding procedure whereby an external and internal ridge or projection, called a flash or bead, is produced by pressure exerted upon the conduit while the conduit ends are in a semi-molten condition. While this flash occurs on both the inner and outer surfaces, it is usually objectionable only on the inner surface, causing a reduction in flow and an increase in turbulence of fluids passed therethrough. The ridge forms a collection lip causing possible accumulation and contamination when such conduits are used in food processing. Such ridges or beads are intolerable in vacuum conveyor systems where the object being conveyed must conform to the walls of the conduit and are undesirable for use as electrical conduits because of the probability of wear on wire insulation.

A principal object of this invention is to provide means for removing the internal flash which results from welding together sections of thermoplastic conduit. Another object of the invention is to provide means for shearing an internal bead from thermoplastic conduits and for removing the severed bead from the conduits. Still another object of this invention is to provide a device which is self-centering in a thermoplastic conduit, which will shear a welding bead from the wall of a thermoplastic conduit and which will remove the sheared bead from the conduit. Other objects and advantages of the invention will be apparent to one skilled in the art upon study of the disclosure of the invention including the detailed description and the appended drawing wherein:

FIGURE 1 is a perspective view of a preferred embodiment of the invention positioned in a conduit which is shown partly in section; and FIGURE 2 is an elevation, partly in section, of the device of FIGURE 1.

Referring now to the drawing, and particularly to FIGURE 1, cylinder 10 has a plate 11 secured to its base for attaching a handle (not shown) in the threaded fitting 12. The cylinder 10 is bifurcately truncated at its other end to form the cutting edge 13. The truncation of the hollow cylinder 10 can be accomplished by cutting a V notch in the end of the cylinder so that the sides of the V notch extend to the opposite sides of the cylinder. This V notch is beveled or chamfered on its inner side so as to form a cutting edge all along the truncation of the cylinder. The cylinder is adapted for a close fit in the thermoplastic pipe 14 so that the sharpened edge 13 of the cylinder will shear off the flash 15 flush with the pipe wall so as to leave a smooth inner surface on the pipe 14. The cylinder 10, shown by dotted lines, is in position for starting to shear the flash or bead 15 from the wall of the pipe 14; and the cylinder 10, shown in solid lines, is shown as having sheared the bead 15 from the pipe wall with the severed bead being removed from the pipe by the hook or catch pin 16. The hook 16 is secured to the interior of the flash cutting cylinder 10 by welding at 17. The hook point 18 is positioned ahead of the beveled cutting edge 13 and presses against the wall of pipe 14 so as to ride over the flash 15 as the cylinder is advanced through the pipe 14 and to pick up and retain the severed flash 15 as the cylinder 10 is backed out of the pipe 14.

FIGURE 2 is an elevation, partly in section, of the flash cutting cylinder 10 showing the beveled cutting edge 13 of one of the bifurcations or legs of the V notch cut in the flash cutting cylinder 10. The catch pin 16 is preferably made of a resilient material such as spring steel and is secured to the interior of the cylinder 10 such as by welding, as indicated at 17 so that the point 18 is in the form of a hook with the point 18 resiliently pressing against the wall of the pipe through which the cylinder 10 is passed.

The operation of the apparatus will be described as applied to the removal of the internal bead resulting from the welding together of sections of polyethylene pipe. As each section of pipe is welded in position, the cylinder 10 is pushed through the pipe by means of a handle which is threaded into the fitting 12. Short sections of small diameter pipe indicated at 19 can be threaded into the fitting 12 and to each other as the cylinder 10 is pushed through the pipe, or a single section of pipe or rod can be employed as desired. The cylinder 10 is adapted for a snug, sliding fit in the pipe 14 so that the projecting bead 15 is sheared smoothly from the pipe wall as the cylinder 10 passes the welded connection. The hook point 18 of catch pin 16 passes ahead of the cutting edge 13 in sliding contact with the pipe wall 14 and rides over the projecting bead 15. After the cutting cylinder 10 has progressed past the welded connection in pipe 14 and is withdrawn therefrom, the point 18 of catch pin 16 picks up the severed bead and withdraws same from the pipe.

The flash cutter 10 is shown as a hollow, right circular cylinder adapted for use in cylindrical pipe or tubing; however, the invention is applicable for use in substantially any shaped conduit which has a constant cross-sectional area. Thus, the device can be in the shape of a hollow rectangle with the leading sides or corners extended and sharpened to provide diagonal cutting edges with respect to the projecting bead or flash. The angular cutting edge, with respect to the projecting bead, results in the bead being smoothly sheared from the conduit wall and requires a minimum of force applied to the flash cutter because only a portion of the bead or flash is being cut at any one time.

As illustrated, the flash cutter is a bifurcately truncated cylinder having two cutting edges 13 represented by the bifurcated portions; however, the flash cutter can be a truncated, hollow, right circular cylinder having only one cutting edge 13 or can be a hollow, right circular cylinder having a plurality of V-shaped notches in one end thereof beveled on the inner sides to provide a plurality of cutting edges 13. In any event, one or more hook-shaped catch pins will be employed to engage and remove the severed flash or bead. The plane of the truncation will preferably be ungulate in form so as to present an oblique cutting edge to the flash.

The flash cutter will ordinarily be fabricated from metal but can be any material whose sharpened edge will shear off the protective flash or bead from the thermoplastic conduit sections which are welded together.

That which is claimed is:

1. For use in welding together sections of thermoplastic pipe whereby an annular thermoplastic bead is formed on the inside of the pipe at the welded joint, apparatus for removing said bead which comprises a hollow cylinder of substantially the same diameter as the inside of the pipe, having a V cut in one end thereof with the sides of the V extending to the sides of the cylinder and sharpened to a cutting edge; a hook resiliently secured to the interior of said cylinder so that the point of the hook presses against the sides of the pipe ahead of said cutting edge; and handle means secured to said cylinder to advance said cylinder through said pipe past said bead and to retrieve said cylinder and said bead from said pipe.

2. Apparatus for removing the annular flash from the interior of a welded junction of theromplastic tubes which comprises a bifurcately truncated, hollow, right circular cylinder of substantially the diameter of the inside of the tubes; a spring loaded catch pin secured to the interior of said cylinder, extending outwardly from each side of said cylinder between the tips of the bifurcations and pointed toward the base of said cylinder; and handle means secured to said cylinder to advance said cylinder through said tubes past said junction and to remove same from said pipes.

3. Apparatus for removing the annular flash from the inside of a thermoplastic conduit resulting from welding two sections of conduit together which comprises a hollow member with a plurality of extended cutting edges adapted to conform to the inner surface of the conduit; a plurality of hooks resiliently secured to the interior of said hollow member so as to press outwardly against the walls of the conduit between and ahead of said cutting edges with respect to the cutting direction of travel of the edges; and handle means secured to said hollow member to advance said hollow member through said conduit past said flash and to retrieve said member and said flash from said conduit.

4. Apparatus for removing the annular internal bead from the welded junction of sections of thermoplastic conduit which comprises a truncated, hollow member adapted for a sliding fit in said conduit and having the truncation sharpened to a cutting edge; a hook resiliently secured to the interior of said hollow member with the point of the hook extending outwardly and ahead of said cutting edge; and means secured to said hollow member to pass said hollow member in shearing contact with said bead and to retrieve said member and said bead.

References Cited in the file of this patent
UNITED STATES PATENTS

| | | |
|---|---|---|
| 2,053,829 | Hise | Sept. 8, 1936 |
| 2,548,702 | Chamberlain | Apr. 10, 1951 |
| 2,981,127 | Ranson | Apr. 25, 1961 |